(12) United States Patent
Van Rees et al.

(10) Patent No.: US 6,443,512 B1
(45) Date of Patent: Sep. 3, 2002

(54) SHOCK ABSORBING BUMPER SYSTEM

(75) Inventors: H. Barteld Van Rees, Needham, MA (US); Delbert Lippert, Cobden (CA)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/931,632

(22) Filed: Aug. 16, 2001

(51) Int. Cl.$^7$ ................................................ B60R 19/26
(52) U.S. Cl. ........................ 293/132; 293/102; 293/124; 293/120; 267/139; 267/166
(58) Field of Search ................................. 293/124, 137, 293/145, 129, 135, 138, 102, 132, 120; 267/136, 139, 166, 174

(56) References Cited

U.S. PATENT DOCUMENTS

| | | | | |
|---|---|---|---|---|
| 1,302,279 A | * | 4/1919 | Barnett ........................ 293/137 |
| 1,418,453 A | * | 6/1922 | O'Brien ....................... 293/137 |
| 1,715,379 A | * | 6/1929 | Nicholas ...................... 280/756 |
| 1,755,007 A | * | 4/1930 | Jackson ....................... 293/131 |
| 2,186,137 A | * | 1/1940 | Halladay ..................... 293/137 |
| 2,208,076 A | * | 7/1940 | Jones .......................... 293/137 |
| 2,466,265 A | * | 4/1949 | Noonan ....................... 293/137 |
| 2,859,959 A | * | 11/1958 | Hardigg ....................... 293/137 |
| 3,360,225 A | * | 12/1967 | Camossi ...................... 248/638 |
| 3,831,921 A | * | 8/1974 | Negado ....................... 293/137 |
| 3,997,208 A | * | 12/1976 | Nomiyama .................. 293/137 |
| 4,190,227 A | * | 2/1980 | Belfield et al. .............. 248/618 |
| 4,254,978 A | * | 3/1981 | Eshelman .................... 293/137 |
| 4,397,069 A | * | 8/1983 | Camossi ..................... 140/92.2 |
| 5,029,919 A | * | 7/1991 | Bauer .......................... 293/124 |
| 5,947,538 A | | 9/1999 | White .......................... 293/135 |
| 6,007,123 A | * | 12/1999 | Schwartz et al. ........... 293/124 |
| 6,050,624 A | * | 4/2000 | Kim ............................. 293/132 |
| 6,217,090 B1 | | 4/2001 | Berzinji ...................... 293/132 |

OTHER PUBLICATIONS

"Vibration and Shock Control!" (AD); Wire Rope Shock and Vibration Mounts Type Series D; Sebert Engineering GmbH; Hans–Böckler–Strabe 35; D–73230 Kirchheim/Teck.

* cited by examiner

Primary Examiner—Joseph D. Pape
Assistant Examiner—Lori L Coletta
(74) Attorney, Agent, or Firm—Daly, Crowley & Mofford LLP

(57) ABSTRACT

A vehicle bumper system includes a multi-strand cable secured to opposing plates.

19 Claims, 4 Drawing Sheets

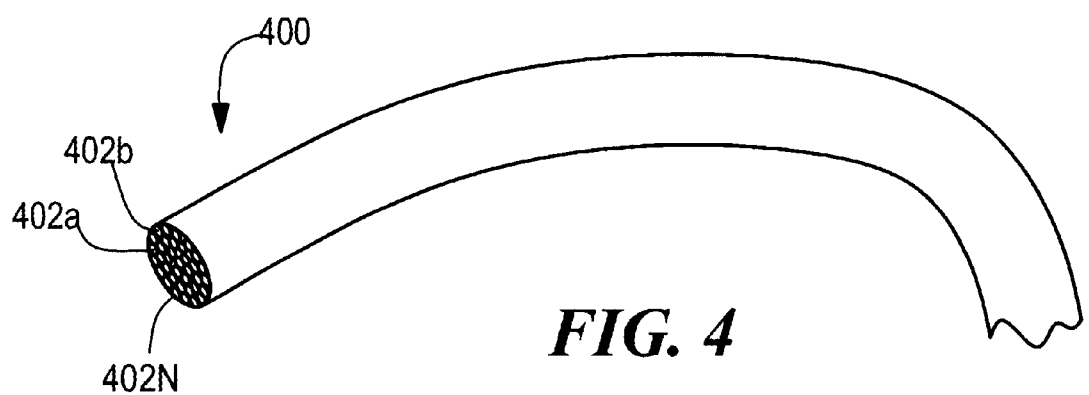
FIG. 4
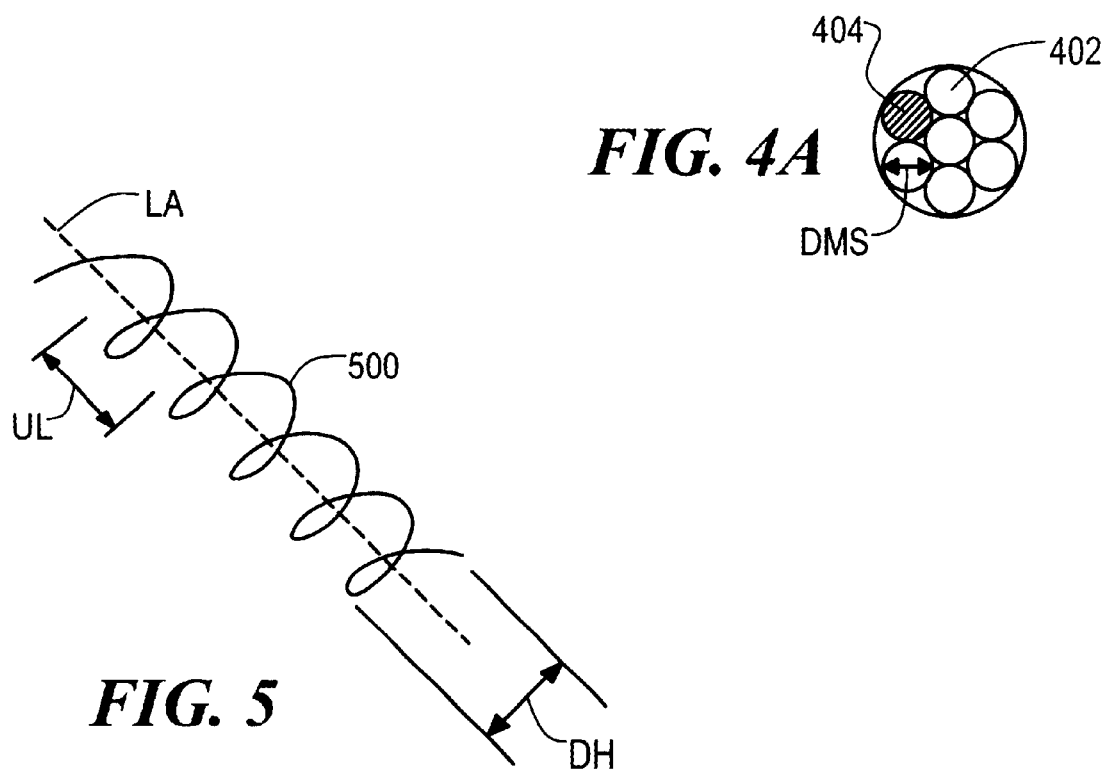
FIG. 4A
FIG. 5
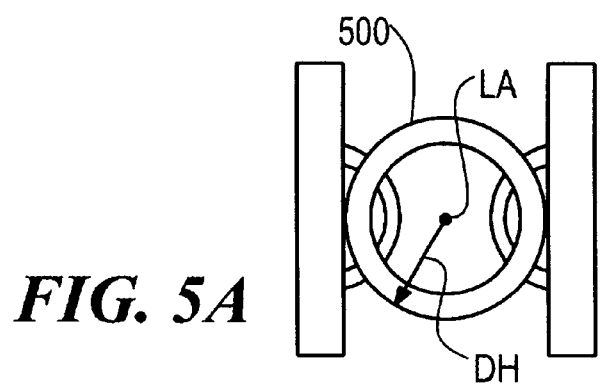
FIG. 5A

SHOCK ABSORBING BUMPER SYSTEM

CROSS REFERENCE TO RELATED APPLICATIONS

Not Applicable.

STATEMENT REGARDING FEDERALLY SPONSORED RESEARCH

Not Applicable.

FIELD OF THE INVENTION

The present invention relates generally to energy absorption and, more particularly, to shock absorbing systems.

BACKGROUND OF THE INVENTION

As is known in the art, automobiles generally include bumpers located at the front and rear ends. The bumpers typically include a metal bar horizontally secured to the frame at two locations. The bumpers absorb impact energy in collisions and attempt to minimize damage for relatively low speed impacts. For example, 5 mile-per-hour damage testing is typically conducted to determine crash worthiness and damage levels. However, many vehicles having conventional bumpers fare poorly in such tests.

The limitations and costs associated with repairing conventional bumpers are well known to one of ordinary skill in the art. For example, even low speed impacts can cause considerable damage to most car bumpers. The metal bar can be plastically deformed so as to require replacement. Plastic fascias covering the bar do not hide damage. Thus, most conventional bumpers are useful for one impact at most.

There have been numerous attempts to provide more durable bumpers. For example, some bumpers use various configurations of pistons, cylinders, and springs in an attempt to improve bumper durability. However, such bumpers are expensive, complex, and relatively unreliable.

It would, therefore, be desirable to provide an automobile bumper system that overcomes the aforesaid and other disadvantages.

SUMMARY OF THE INVENTION

The present invention provides an automobile bumper system having a multi-strand cable affixed to opposing plates. With this arrangement, the bumper minimizes damage to the plates by dissipating impact energy in the form of heat generated by friction between cable strands. While the invention is primarily shown and described in conjunction with automobile bumpers, it is understood that the invention is applicable to a variety of vehicles that may have collisions.

In one aspect of the invention, an automobile bumper system includes a multi-strand cable secured to opposing first and second plates. The cable/plate assembly can be covered by a fascia for aesthetic appeal. The bumper system can be affixed to the automobile frame to secure the bumper system in position. In an exemplary embodiment, bumper systems are secured to the front and rear of an automobile.

BRIEF DESCRIPTION OF THE DRAWINGS

The invention will be more fully understood from the following detailed description taken in conjunction with the accompanying drawings, in which:

FIG. 4 is a schematic depiction of a multi-stranded cable that can be used in the bumper system of FIG. 2;

FIG. 4A is a front view of a multi-stranded cable that can be used in the bumper system of FIG. 2;

FIG. 5 is a schematic depiction of a multi-stranded cable having a helix diameter that can be used in the bumper system of FIG. 2;

FIG. 5A is a front view of a portion of a bumper system in accordance with the present invention;

DETAILED DESCRIPTION OF THE INVENTION

Figure 1:
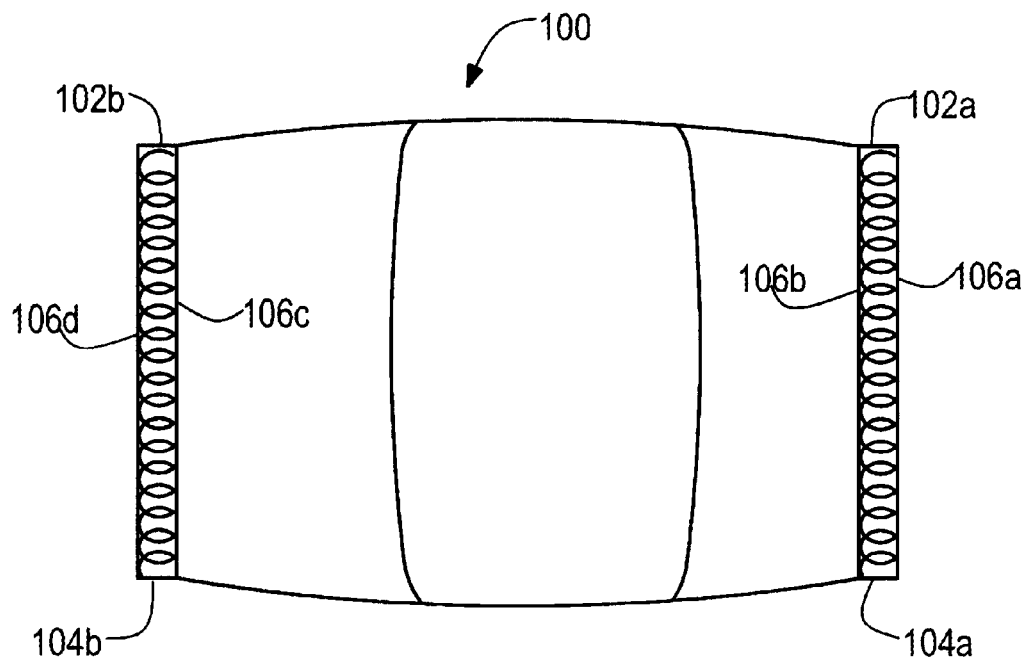
FIG. 1 is a schematic depiction of an automobile having a front and rear bumper system in accordance with the present invention.

FIG. 1 shows a vehicle 100 including front and rear shock absorbing bumpers 102a,b in accordance with the present invention. The front bumper 102a includes a stranded cable 104a secured between opposing plates 106a,b. Similarly, the rear bumper 102b includes a stranded cable 104b secured between first and second plates 106c,d. While the invention is primarily shown and described in conjunction with an automobile, it is understood that the invention is applicable to a variety of vehicles.

Figure 2:
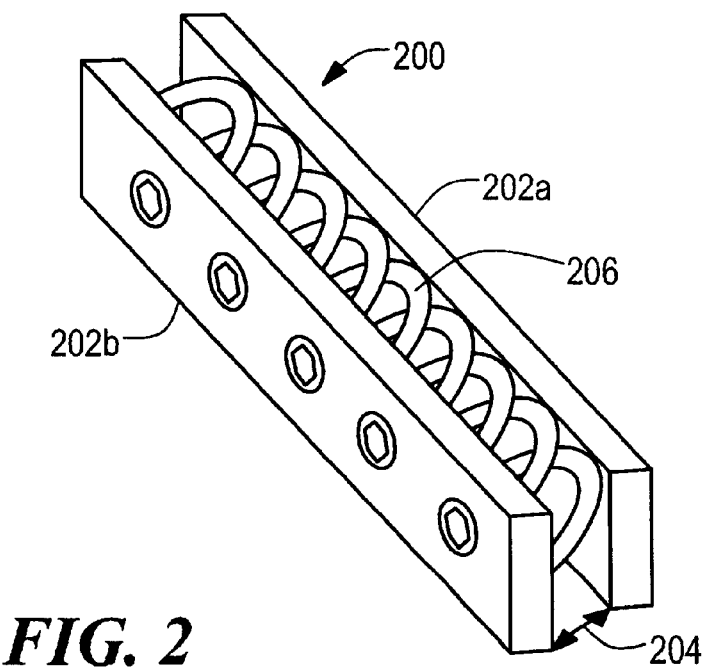
FIG. 2 is a schematic depiction of a bumper system having a cable secured to opposing plates in accordance with the present invention.

FIG. 2 shows further details of a bumper system in accordance with the present invention. A bumper 200 includes first and second plates 202a,b in spaced opposition. A multi-strand cable 206 is located in a gap 204 formed by the space between the first and second plates 202. In general, the cable 206 has a helical shape that is secured to the plates 202 at predetermined positions. In one particular embodiment, the helical cable 206 is secured to each of the respective plates 202 once per revolution of the cable. That is, the cable 206 is secured to the plates 202 at points where the helical cable is proximate the plates.

The cable 206 can be secured to the plates 202 using a variety of holding mechanisms including holding brackets, weaves through the plates, welds, and the like. It is understood that one of ordinary skill in the art can use a wide range of suitable holding mechanisms to meet the needs of a particular application without departing from the present invention.

Figure 3:
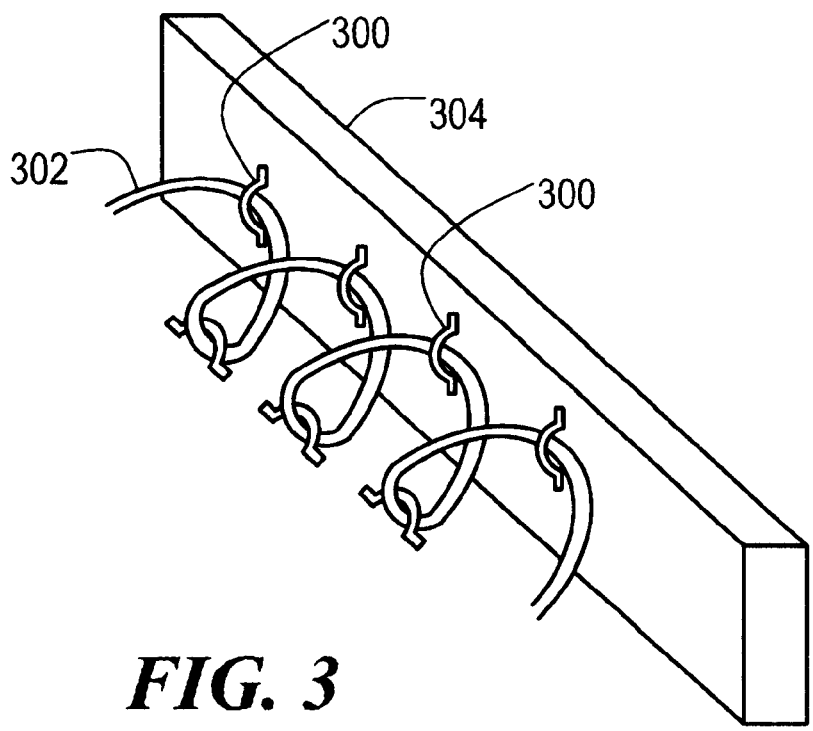
FIG. 3 is a schematic depiction of a portion of the bumper system of FIG. 2 showing the cable secured to one of the plates.
Figure 3A:
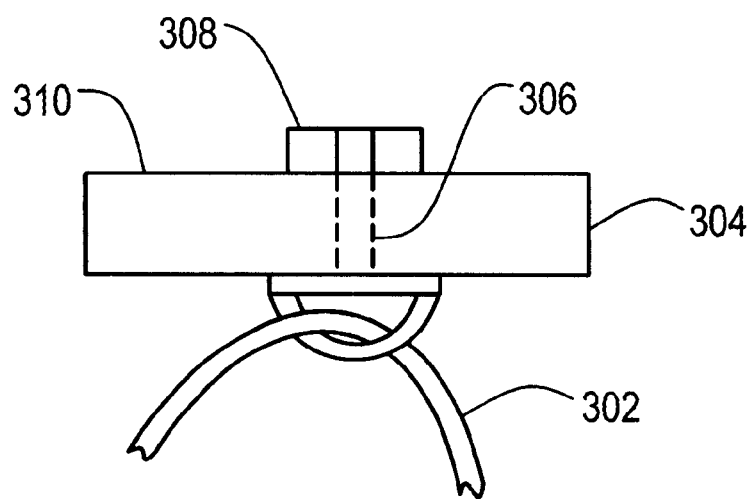
FIG. 3A is a side view of a portion of the bumper system of FIG. 2.

FIGS. 3 and 3A show an exemplary embodiment in which a series of holding brackets 300 are used to secure the multi-strand cable 302 to a first plate 304 and a second plate (not shown). The holding brackets 300 can be affixed to the plate 304 with bolts 306 passing through the plates 304 for coupling with a nut 308 on an outer surface 310 of the plate (FIG. 3A).

FIGS. 4 and 4A show an exemplary multi-stranded cable 400 that can form a part of a bumper system in accordance with the present invention. In general, the cable 400 has a plurality of major strands 402a-N that can be intertwined in a conventional manner. The major strands 402 can comprise a plurality of minor strands 404.

It is understood that one of ordinary skill in the art can readily vary the number and geometry of the cable strands can vary based upon the requirements of a particular application. The cable and strand diameter and the number of windings can be selected to provide a desired level of shock absorbtion. For example, a 1000 kg car can include a bumper having about a 0.5 inch diameter cable and about 40 windings over about five feet.

An exemplary range for the number of major stands is from about 3 to about 30. An exemplary range for the diameter of the major stands is from about 0.125 inch to about 0.5 inch.

In one particular embodiment, the cable has about five major strands each formed from a plurality of minor strands. The major strands have a diameter DMS (FIG. 4A) of about 0.25 inch and the minor strands have a diameter of about $\frac{1}{32}$ of an inch. The cable has an overall diameter of about 0.5 inch. In an alternative embodiment, the cable can be provided as stainless steel cable identified as AISI 316 7×7 having a diameter of about ten millimeters.

As shown in FIGS. 5 and 5A, the cable 500 is in the form of helix having a longitudinal axis LA and a diameter DH. It is understood that the diameter of the helix can vary to meet the needs of a particular application. In addition, the number of revolutions per unit length UL can vary based upon the geometry of the cable and application.

In an illustrative embodiment, the diameter DH of the helix formed by the coil can range from about an inch to about twenty-four inches, and more preferably, from about two inches to about six inches.. A helix diameter ranging from about three inches to about six inches is more typical for automobile bumpers.

The size, shape, position and material of the opposing plates can also vary based upon the intended application. Exemplary materials for the plates include steel, aluminum, and structured sheet metal. An exemplary plate has a length of about 0.5 meter a height of about six inches and a thickness of about one inch. Exemplary shapes for the plates include flat, arcuate, triangular, and polygonal.

In general, the plates should be relatively rigid and shaped to transfer as much energy as possible to the cable while minimizing plastic deformation of the plates. Since most of the impact energy is transferred to the cable, plastic deformation of the plates is minimized. For relatively low speed impacts e.g., 5–10 mph, damage to the plates should be avoided. Even with some about of permanent deformation, a fascia covering the bumper should hide damage to the plates.

Figure 6:
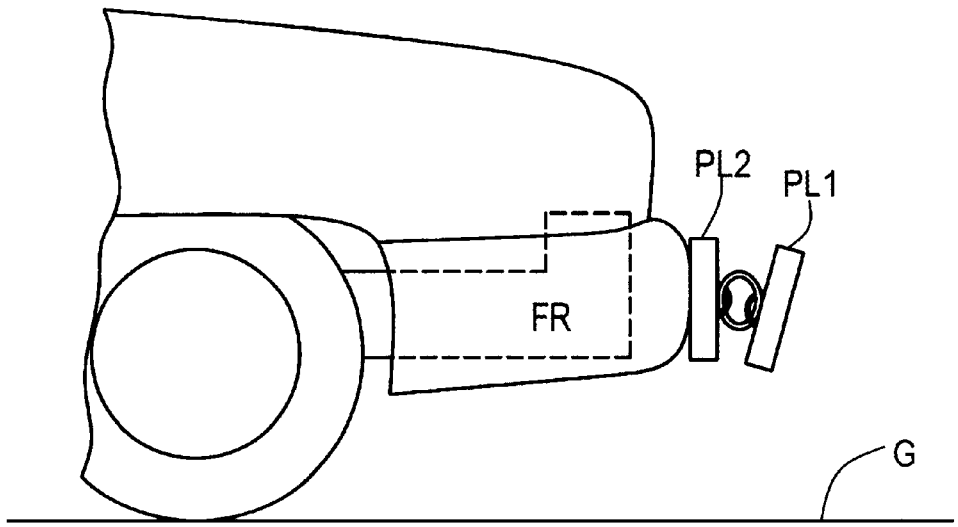
FIG. 6 is a schematic depiction of an angled bumper system in accordance with the present invention.
Figure 6A:
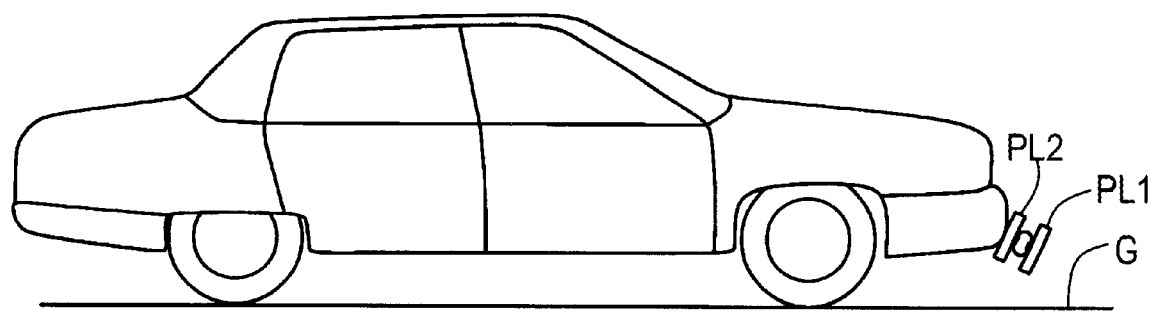
FIG. 6A is a schematic depiction of a further angled bumper system in accordance with the present invention.

While the plates are shown as being substantially parallel, it is understood the angular position of the plates PL1, PL2 can be adjusted as shown in FIG. 6, based upon the expected direction of impact. For example, a larger vehicle may have a plate PL1 angled slightly downward (with respect to the ground G, i.e., the horizontal) for optimal energy absorption when colliding with a smaller vehicle. In the embodiment shown, one of the plates PL2 can be secured to a frame FR of the vehicle. Alternatively, the plates PL1,PL2 can be parallel with the bumper angled downwardly with respect to the ground G, as shown FIG. 6A.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A vehicle bumper, comprising:

first and second plates in spaced opposition;

a helical cable having a longitudinal axis and a plurality of major strands secured to the first and second plates, wherein the longitudinal axis is substantially parallel to the first plate.

2. The bumper according to claim 1, wherein at least one of the plurality of major strands comprises a plurality of minor strands.

3. The bumper according to claim 1, wherein the plurality of major strands comprises at least three major strands.

4. The bumper according to claim 1, wherein the cable helix has a diameter ranging from about two inches to about six inches.

5. The bumper according to claim 2, wherein a diameter of the at least one of the plurality of major strands has a diameter ranging from about 0.125 inch to about 0.5 inch.

6. The bumper according to claim 1, wherein the cable has a diameter of at least 0.5 inch.

7. The bumper according to claim 1, wherein the cable has a predetermined number of revolutions per unit length along a longitudinal axis of the cable.

8. The bumper according to claim 1, wherein the first plate has a shape selected from the group consisting of rectangular, arcuate, triangular and polygonal.

9. The bumper according to claim 1, wherein the first and second plates are substantially parallel.

10. The bumper according to claim 9, wherein device is angled based upon an angle of expected impact.

11. The bumper according to claim 1, wherein the first plate is angled with respect to the second plate based upon an expected angle of impact.

12. The bumper according to claim 1, further including a series of attachment mechanisms securing the cable to the first and second plates.

13. The bumper according to claim 1, wherein the cable passes through a series of apertures in the first plate.

14. A vehicle, comprising:

a frame; and a bumper secured to the frame, the bumper including
        first and second plates in spaced opposition; and
        a helical multi-strand cable secured to the first and second plates, the cable having a longitudinal axis being substantially parallel with the first plate.

15. The vehicle according to claim 14, wherein the first plate is angled with respect to the second plate based upon an expected impact angle.

16. The vehicle according to claim 14, wherein the first and second plates are substantially parallel.

17. The vehicle according to claim 16, wherein the bumper is angled with respect to horizontal.

18. A method for absorbing impacts, comprising:

securing a helical multi-strand cable to first and second plates disposed in spaced opposition to provide a bumper, wherein a longitudinal axis of the cable is substantially parallel to the first plate; and securing the bumper to a vehicle frame.

19. The method according to claim 18, further including angling the bumper based upon an angle of expected impacts.

* * * * *